(12) United States Patent
Fuhst et al.

(10) Patent No.: US 9,057,228 B2
(45) Date of Patent: Jun. 16, 2015

(54) WELLBORE TOOLS WITH NON-HYDROCARBON-BASED GREASES AND METHODS OF MAKING SUCH WELLBORE TOOLS

(75) Inventors: Karsten Fuhst, Niedersachsen (DE); Jan C. Bertke, Niedersachsen (DE)

(73) Assignee: Baker Hughes Incorporated, Houston, TX (US)

( * ) Notice: Subject to any disclaimer, the term of this patent is extended or adjusted under 35 U.S.C. 154(b) by 316 days.

(21) Appl. No.: 13/537,474

(22) Filed: Jun. 29, 2012

(65) Prior Publication Data

US 2014/0000966 A1    Jan. 2, 2014

(51) Int. Cl.
| | |
|---|---|
| *E21B 10/24* | (2006.01) |
| *F16N 3/10* | (2006.01) |
| *C10M 169/06* | (2006.01) |
| *E21B 41/00* | (2006.01) |
| *E21B 7/06* | (2006.01) |

(52) U.S. Cl.
CPC . *E21B 10/24* (2013.01); *F16N 3/10* (2013.01); *C10M 169/06* (2013.01); *E21B 41/00* (2013.01); *E21B 7/06* (2013.01); *E21B 7/068* (2013.01); *C10M 2201/041* (2013.01); *C10M 2201/065* (2013.01); *C10M 2201/087* (2013.01); *C10M 2201/105* (2013.01); *C10M 2207/1256* (2013.01); *C10M 2213/0606* (2013.01); *C10M 2213/062* (2013.01); *C10M 2213/0626* (2013.01); *C10M 2219/0445* (2013.01); *C10N 2230/02* (2013.01); *C10N 2230/06* (2013.01); *C10N 2230/10* (2013.01); *C10N 2250/10* (2013.01)

(58) Field of Classification Search
CPC .......... E21B 4/003; E21B 10/22; E21B 10/24
USPC ............................ 166/84.2; 175/227; 508/588
See application file for complete search history.

(56) References Cited

U.S. PATENT DOCUMENTS

| 4,358,384 | A |   | 11/1982 | Newcomb et al. |
| 4,431,556 | A | * | 2/1984 | Christian et al. .............. 508/182 |

(Continued)

FOREIGN PATENT DOCUMENTS

EP    2055890 A1    5/2009

OTHER PUBLICATIONS

Rudnick et al., Synthetic Lubricants and High-Performance Functional Fluids, 2nd Ed.Marcel Dekker, Inc., N.Y. (1999), 37 pages.

(Continued)

*Primary Examiner* — Brad Harcourt
(74) *Attorney, Agent, or Firm* — TraskBritt (57) ABSTRACT

A wellbore tool includes a non-hydrocarbon-based grease disposed between a first component and a second component. The grease remains substantially impermeable to hydrocarbons at temperatures up to at least about 150° C. and possibly up to at least about 200° C., and pressures up to at least about 27 MPa and possibly to at least about 50 MPa. Methods of forming such wellbore tools include selecting a grease to comprise a non-hydrocarbon-based grease that remains at least substantially impermeable to hydrocarbons at temperatures up to at least about 150° C. and possibly up to at least about 200° C., and pressures up to at least about 27 MPa and possibly to at least about 50 MPa; and disposing the grease at an interface between a first component of a wellbore tool and a second component of a wellbore tool.

13 Claims, 3 Drawing Sheets

(56) References Cited

U.S. PATENT DOCUMENTS

| | | |
|---|---|---|
| 5,152,353 A | 10/1992 | Denton |
| 5,668,092 A | 9/1997 | Denton at al. |
| 6,056,072 A | 5/2000 | Koltermann et al. |
| 7,312,185 B2 | 12/2007 | Willey et al. |
| 7,749,947 B2 | 7/2010 | Griffo et al. |
| 8,084,405 B2 | 12/2011 | Howell et al. |
| 2008/0257610 A1 | 10/2008 | Koltermann et al. |
| 2010/0326736 A1* | 12/2010 | Hall et al. .................... 175/228 |
| 2011/0005771 A1 | 1/2011 | Watson et al. |
| 2011/0031020 A1* | 2/2011 | Cote ............................. 175/56 |
| 2011/0048809 A1 | 3/2011 | Duckworth et al. |

OTHER PUBLICATIONS

International Search Report for International Application No. PCT/US2013/036086 mailed Jul. 25, 2013, 3 pages.
International Written Opinion for International Application No. PCT/US2013/036086 mailed Jul. 25, 2013, 6 pages.

* cited by examiner

WELLBORE TOOLS WITH NON-HYDROCARBON-BASED GREASES AND METHODS OF MAKING SUCH WELLBORE TOOLS

FIELD

Embodiments of the present disclosure relate to wellbore tools having non-hydrocarbon-based greases and to methods of making such wellbore tools.

BACKGROUND

Wellbores are formed in subterranean formations for various purposes including, for example, extraction of oil and gas from the subterranean formation and extraction of geothermal heat from the subterranean formation. Wellbores may be formed in a subterranean formation using various types of drill bits along with other wellbore tools. The downhole environment can be very harsh, with temperatures as high as 175° C. or more, and pressures as high as 100 MPa or more. Wellbore tools and the components thereof must be able to withstand such extreme pressures and temperatures. Furthermore, drilling of the subterranean formation generates extensive debris, which may be carried within the pressurized drilling fluid. Wellbore tools may be subjected to prolonged contact with such pressurized drilling fluid.

Many wellbore tools include components that need to be sealed from exposure to pressurized drilling fluid. Thus, seals are provided between adjacent components of such tools to prevent the pressurized drilling fluid from flowing between the adjacent components. In some tools, the adjacent components may be configured to move relative to one another. Seals between such components are referred to as "dynamic" seals, whereas seals between adjacent components that do not move relative to one another are referred to as "static" seals. The seal is established by providing a fluid-tight joint between the components that is intended to prevent migration of liquids and/or gases through the interface between the components. Wellbore tools commonly utilize various polymeric and elastomeric seals to provide both static and dynamic sealing between stationary and moving components, respectively.

Wellbore tools also utilize grease to provide lubricity between moving parts. Greases for wellbore tools should be able to withstand the harsh downhole environment throughout use of the tool, and without changing properties or characteristics. Greases for wellbore tools need to exhibit suitable rheological properties such as viscosity over the service periods for the tools. Greases for wellbore tools also should remain at least substantially chemically inert with respect to the wellbore fluids and various chemicals found in the downhole environment. A variety of grease compositions have been reported for use in wellbore tools. Such grease compositions often exhibit a relatively high viscosity, and typically comprise refined petroleum (hydrocarbon) oil or mineral oil, which provides the basic lubricity of the composition and may constitute about ¾ of the total grease composition. For example, U.S. Pat. No. 4,358,384, issued on Nov. 9, 1982 to Newcomb, describes a grease for a roller cone drill bit that is based on a petroleum derived, hydrocarbon oil and metal soap or metal complex thickener. U.S. Patent Publication No. 2011/0048809, published on Mar. 3, 2011 to Duckworth et al., describes a grease for use with a roller cone drill bit that includes: a base oil selected from the group consisting of a mineral oil, a synthetic oil, and combinations thereof; a metal sulfonate thickener; at least one solid additive selected from the group consisting of graphite, polytetrafluoroethylene, silica, inorganic sulfur-containing solids, inorganic phosphorus-containing solids, inorganic boron-containing solids, and any combinations thereof; and at least one oil-soluble additive selected from the group consisting of extreme pressure additives, oxidation inhibitors, wear and friction reducing additives, and polymer additives. U.S. Pat. No. 7,312,185, issued on Dec. 25, 2007 to Willey et al., discloses the use of high-viscosity poly-α-olefin (PAO) and other synthetic lubricants such as alkylated naphthalene to enhance the thermal stability of a grease.

BRIEF SUMMARY

In some embodiments, the present disclosure includes a wellbore tool comprising a first component, a second component, and a grease disposed between the first component and the second component. The grease comprises a non-hydrocarbon-based grease that remains at least substantially impermeable to hydrocarbons at temperatures up to at least about 150° C. and possibly up to at least about 200° C., and pressures up to at least about 27 MPa and possibly to at least about 50 MPa.

In other embodiments, the present disclosure includes a method of manufacturing a wellbore tool. Grease is disposed at an interface between a first component of the wellbore tool and a second component of the wellbore tool, and the grease is selected to comprise a non-hydrocarbon-based grease that remains at least substantially impermeable to hydrocarbons at temperatures up to at least about 150° C. and possibly up to at least about 200° C., and pressures up to at least about 27 MPa and possibly to at least about 50 MPa.

BRIEF DESCRIPTION OF THE DRAWINGS

While the specification concludes with claims particularly pointing out and distinctly claiming what are regarded as embodiments of the disclosure, various features and advantages of this disclosure may be more readily ascertained from the following description of example embodiments provided with reference to the accompanying drawings.

DETAILED DESCRIPTION

As used herein, the term "wellbore" means a man-made conduit formed in a subterranean formation or series of formations for any purpose, such as extraction of oil or gas from the subterranean formation, or extraction of geothermal heat from the subterranean formation As used herein, the term "wellbore tool" means and includes any article, tool or component to be used within a wellbore in a subterranean formation. Wellbore tools include, without limitation, tools and components used in testing, surveying, drilling, enlarging, completing, sampling, monitoring, utilizing, maintaining, repairing, etc., a wellbore.

The illustrations presented herein are not meant to be actual views of any particular wellbore tool, or component thereof, but are merely representations that are employed to describe embodiments of the present disclosure.

Although the wellbore tool described in detail herein is a rib steered motor, the rib steered motor is set forth as only one non-limiting example of a wellbore tool that may include a grease as described herein. Additional embodiments of the present disclosure include other wellbore tools that include such grease.

Reference will now be made to the drawings, wherein like numerals refer to like components throughout. The drawings are not necessarily drawn to scale.

Figure 1:
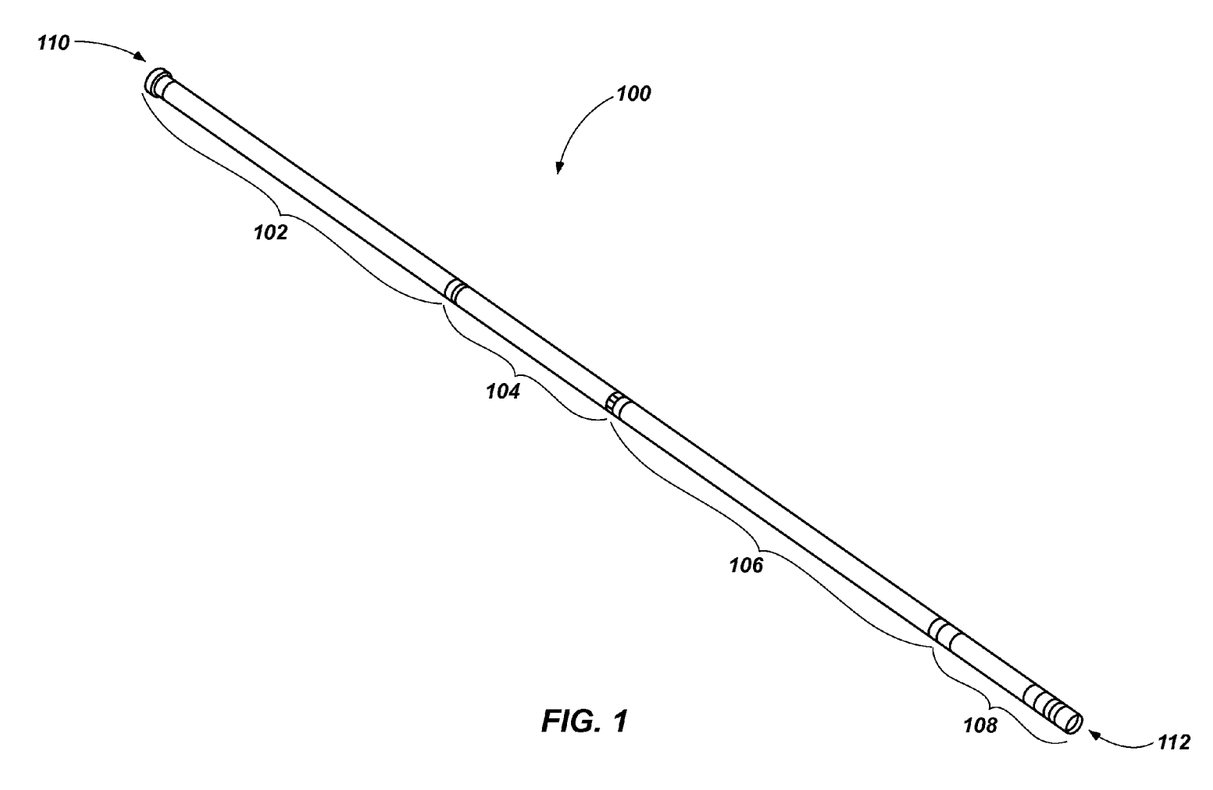
FIG. 1 is a schematic illustration of a rib steered motor that includes grease having a composition as described herein.

FIG. 1 is a schematic illustration of a wellbore tool comprising a rib steered motor 100. The rib steered motor 100 may include various sections with fluid communications, which may be coupled to one another in an end-to-end manner to form the rib steered motor 100. For example, the rib steered motor 100 may comprise a power and control section 102, a sensing and measurement section 104, a motor section 106, and a steering section 108. The distal end 112 of the rib steered motor 100 may be configured for attachment to a drilling tool used to form or enlarge a wellbore, such as a rotary drill bit (not shown). As the drilling fluid is pumped down through the rib steered motor 100 under pressure, the flowing pressurized fluid is used by the motor section 106 to drive rotational movement of a drive shaft at the distal end 112 of the rib steered motor 100 to which the drilling tool is attached, which drives rotation of the drilling tool.

The power and control section 102 of the rib steered motor 100 may comprise electronic devices and/or systems, which may be used to transmit signals to, and receive signals from, the surface of the formation. The electronic devices and/or systems also may be used to selectively control (e.g., activate and deactivate) other active components of the rib steered motor 100. In addition, the ribbed steered motor 100 may include a closed reservoir of hydraulic fluid, and an electric motor for pressurizing the hydraulic fluid in the reservoir. The hydraulic fluid may be separated and isolated from the drilling fluid (e.g., drilling mud) during use of the rib steered motor 100. Fluid conduits may be provided within the rib steered motor 100 that provide fluid communication between the reservoir of hydraulic fluid and other movable components of the rib steered motor 100. Such conduits allow pressurized hydraulic fluid within the reservoir and the conduits to cause movement of the active components. As a non-limiting example, the steering section 108 may include movable steering pads, and the pressurized hydraulic fluid may be used to move the steering pads radially outward relative to a longitudinal axis of the rib steered motor 100.

With continued reference to FIG. 1, the sensing and measurement section 104 may include various sensors and devices for sensing and/or measuring states or characteristics of the rib steered motor 100 and/or states or characteristics of the formation in which the rib steered motor 100 is disposed. For example, the sensing and measurement section 104 may be configured to sense an angle of inclination of the rib steered motor 100 relative to the direction of the gravitational field. In one embodiment, the sensing and measurement section 104 may optionally include a sensor for sending a rotational speed (e.g., revolutions per minute (rpm)) of the rotary steerable motor 100 and/or the drive shaft within the rotary steerable motor 100 to which a drilling tool may be coupled.

The steering section 108 may comprise a plurality of movable steering pads as previously mentioned, each of which may be selectively and independently actuated to cause the steering pad to move radially outward and impinge against a side wall of the formation within the wellbore to generate lateral forces on the rib steered motor 100, which lateral forces may result in angular deviation (e.g., steering) of the drilling tool coupled to the distal end 112 of the rib steered motor 100 as the drilling tool is advanced further into the formation.

Figure 2A:
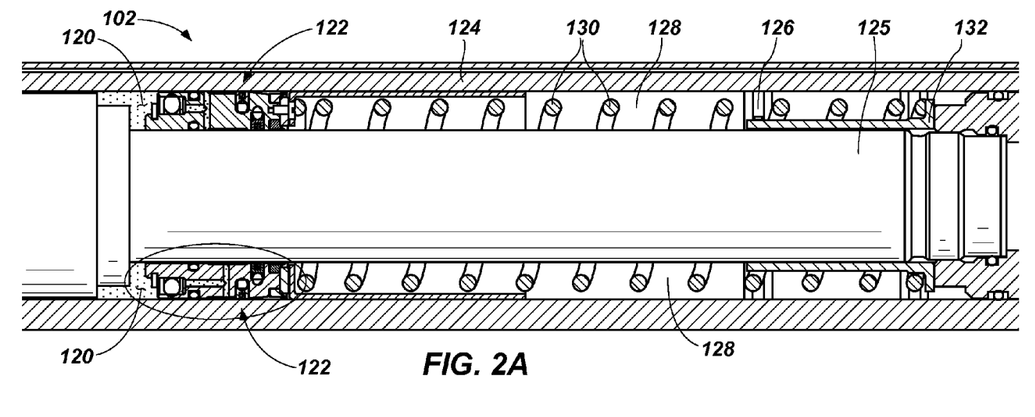
FIG. 2A is a partial cross-sectional side view of a hydraulic compensation section of the rib steered motor of FIG. 1.

FIG. 2A is a schematic cross-sectional side view of a portion of the power and control section 102 of the rib steered motor 100 of FIG. 1. As previously mentioned, the power and control section 102 may include a closed reservoir of hydraulic fluid 120 (e.g., oil), and an electric motor or other device (not shown) for selectively pressurizing the hydraulic fluid 120 in the reservoir. The power and control section 102 also may include a pressure compensation piston 122 used to maintain a relationship between the pressure of the hydraulic fluid 120 in the closed hydraulic system relative to the pressure of the drilling fluid outside the rib steered motor 100. In other words, as the pressure of the drilling fluid outside the rib steered motor 100 in the annular space between the rib steered motor 100 and the side walls of the formation within the wellbore increases, the pressure compensation piston 122 may increase the pressure of the hydraulic fluid 120 within the closed hydraulic system of the power and control section 102 so as to maintain a predefined pressure differential therebetween.

As shown in FIG. 2A, the pressure compensation piston 122 may have an annular shape, and may be configured to slide longitudinally within the power and control section 102 between an outer tubular body 124 and an inner tubular body 125 (through which drilling fluid may flow through the power and control section 102). A bore 126 may be formed through the outer tubular body 124 to provide fluid communication through the outer tubular body 124 between an interior space 128 within the tubular body 124 (on a side of the pressure compensation piston 122 opposite the hydraulic fluid 120) and the annular space between the rib steered motor 100 and the side walls of the formation within the wellbore. Thus, the drilling fluid in the annular space may flow through the bore 126 and into the interior space 128 adjacent the pressure compensation piston 122. Thus, the pressure of the drilling fluid in the annular space within the wellbore between the rib steered motor 100 and the side walls of the surrounding formation is translated to the pressure compensation piston 122 through the bore 126 and the space 128.

As shown in FIG. 2A, a spring 130 may be provided in the space 128 within the tubular body 124. One end of the spring 130 may abut against the pressure compensation piston 122, and an opposing end of the spring 130 may abut against a fixed, stationary component, such as a sleeve 132, within the tubular body 124. Thus, the spring 130 applies a spring force on the pressure compensation piston 122 so as to apply a pressure differential between the drilling fluid in the space 128 within the tubular body 124 on one side of the pressure compensation piston 122 and the hydraulic fluid 120 on the opposing side of the pressure compensation piston 122. The pressure differential is a function of the spring force applied by the spring 130 on the pressure compensation piston 122.

Figure 2B:
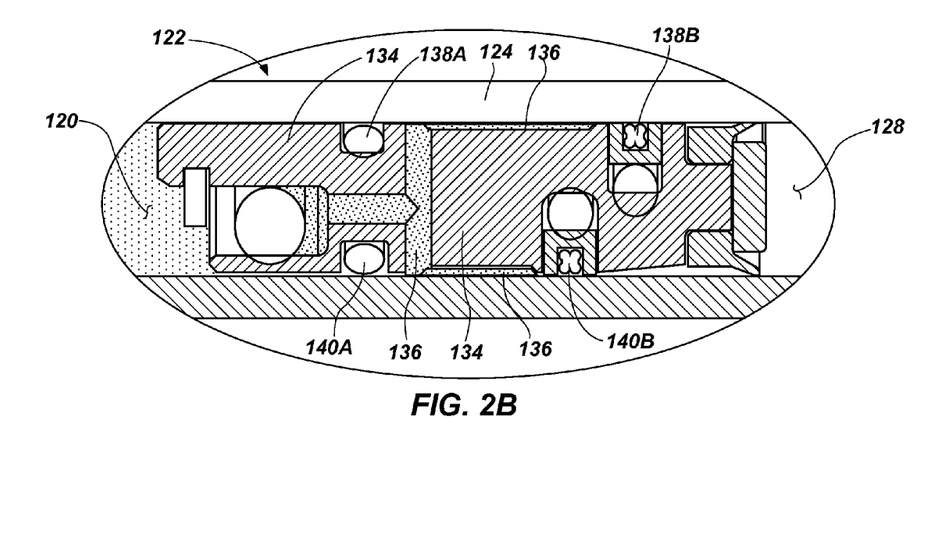
FIG. 2B is an enlarged view of a portion of FIG. 2A, and illustrates grease having a composition as described herein at an interface between components of the hydraulic compensation section.

FIG. 2B is an enlarged view of the pressure compensation piston 122 of FIG. 2A. As shown in FIG. 2B, the pressure compensation piston 122 may include a piston body 134 that is disposed adjacent each of the outer tubular body 124 and the inner tubular body 125. A grease 136 is disposed at an interface between a surface of the piston body 134 of the pressure compensation piston 122 and the adjacent surface of the outer tubular body 124. The grease 136 also may be present at an interface between a surface of the piston body 134 of the pressure compensation piston 122 and the adjacent surface of the inner tubular body 125. As discussed in further detail below, the grease 136 comprises a non-hydrocarbon-based grease that remains at least substantially impermeable to hydrocarbons at temperatures up to 150° C. and possibly up to 200° C., and pressures up to 27 MPa and possibly up to 50 MPa.

Two or more O-ring type seals 138A, 138B may be disposed between the surface of the piston body 134 and the adjacent surface of the outer tubular body 124, and the grease 136 may be disposed longitudinally between the O-ring type seals 138A, 138B at the interface between the piston body 134 and the outer tubular body 124. Similarly, two or more O-ring type seals 140A, 140B may be disposed between the surface of the piston body 134 and the adjacent surface of the inner tubular body 125, and the grease 136 may be disposed longitudinally between the O-ring type seals 140A, 140B at the interface between the piston body 134 and the inner tubular body 125.

The grease 136, together with the 0-ring type seals 138A, 138B and the O-ring type seals 140A, 140B serves as a barrier to prevent or impede the migration of hydrocarbons and chemicals in the drilling fluid in the space 128 into the hydraulic fluid 120 along the interfaces between the piston body 134 and each of the outer tubular body 124 and inner tubular body 125.

Figure 3:
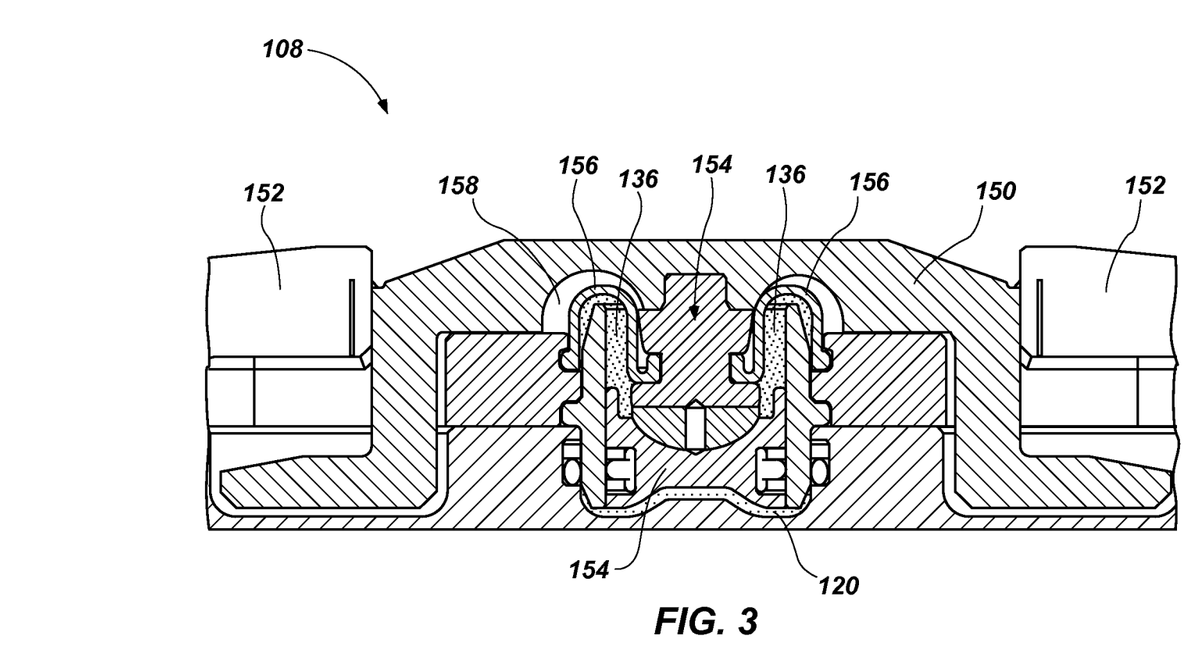
FIG. 3 is a partial cross-sectional side view of a steering section of the rib steered motor of FIG. 1, and illustrates grease having a composition as described herein at an interface between components of the steering section.

The grease 136 also may be disposed between other components of the rib steered motor 100. For example, FIG. 3 is a schematic cross-sectional side view of a portion of the steering section 108 of the rib steered motor 100 of FIG. 1. As shown in FIG. 3, the steering section 108 may include a movable steering rib 150, a steering rib flange 152 surrounding the movable steering rib 150, and a steering piston 154 for driving movement of the steering rib 150 in a radially outward direction. The steering piston 154 may comprise a plurality of components that are assembled together to form the steering piston 154, as shown in FIG. 3. In other embodiments, however, the steering piston 154 may comprise a single body. A rubber bellow 156 may be disposed between the steering piston 154 and the steering rib 150, as shown in FIG. 3.

As shown in FIG. 3, hydraulic fluid 120 is present adjacent an inner surface of the steering piston 154, and communicates with the reservoir of hydraulic fluid 120 in the power and control section 102 of the rib steered motor 100 through a hydraulic fluid conduit (not shown) extending between the power and control section 102 and the steering section 108. Thus, pressurization of the hydraulic fluid 120 by the power and control section 102 pressurizes the hydraulic fluid 120 adjacent the inner surface of the steering piston 154 in the steering section 108.

In operation, when it is desired to move the steering rib 150 in the radially outward direction, the hydraulic fluid 120 is pressurized by the power and control section 102, which causes the steering piston 154 and the steering rib 150 to move in the radially outward direction. As the steering rib 150 moves radially outward, drilling fluid in the annular space between the rib steered motor 100 and the side walls of the formation within the wellbore may be allowed to pass through a gap at an interface between the steering rib 150 and the steering rib flange 152 to prevent the formation of a vacuum as the steering rib 150 moves radially outward. The drilling fluid may flow around the steering rib 150 to a space 158 adjacent and between the rubber bellow 156 and an inner surface of the steering rib 150.

Grease 136 may be disposed between the rubber bellow 156 and the steering piston 154 to serve as a barrier to prevent or impede the migration of hydrocarbons and chemicals in the drilling fluid in the space 158 into the hydraulic fluid 120 along interfaces between the rubber bellow 156 and the steering piston 154.

The grease 136 described herein above may be a semi-solid substance comprising a base oil and a thickener dispersed within the base oil to impart a gel-like texture to the grease 136. Because grease does not flow readily, grease is often used in applications where extended lubrication is required and where oil would not be retained. One of ordinary skill in the art understands the differences between grease and oil, including their differences in physical characteristics and chemical ingredients and in their functions for wellbore tools.

The non-hydrocarbon-based grease 136 may comprise a polymer including perfluoroalkoxy repeating units. Non-limiting examples of such perfluoroalkoxy repeating units may include perfluoromethoxy, perfluoroethoxy, perfluoropropoxy groups, or combinations thereof.

The non-hydrocarbon-based grease 136 may comprise a perfluoroalkylether polymer. By way of example and not limitation, the perfluoroalkylether polymers may include one or more of the following structures:

wherein n is 10 to 60, and (y+m) is 10 to 60.

Perfluoroalkylether polymers are fluorinated synthetic polymers having high inertness against various chemicals, including those hydrocarbons commonly found in drilling fluids and other chemicals commonly found in downhole environments. Perfluoroalkylether polymers may not attack or degrade elastomers and polymers, such as those commonly used in O-ring type seals (e.g., seals 138A, 138B and seals 140A, 140B) and rubber bellows (e.g., the rubber bellow 156), at temperatures up to at least about 150° C., and possibly to a temperature of 285° C. Additionally, the viscosity and lubricity of perfluoroalkylether polymers may deteriorate less upon exposure to temperatures up to at least about 150° C., and possibly to a temperature of 285° C., compared to hydrocarbon-based lubricants, such as mineral oil and PAO lubricants.

Suitable perfluoroalkylether polymers for use in the present disclosure may be homopolymers comprising one type of ether group, or copolymers comprising more than one type of ether groups. The perfluoroalkylether polymers may have a linear structure or non-linear (e.g., branched or cross-linked) structure. The perfluoroalkylether polymers may have a polymer backbone chain including pendant trifluoromethyl groups ($-CF_3$). Furthermore, the perfluoroalkylether polymers may be non-functionalized or functionalized polymers.

Non-limiting examples of perfluoroalkylether polymers suitable for use in grease 136 in accordance with the present disclosure are KRYTOX® perfluoropolyethers, which are commercially available from E.I. du Pont de Nemours and Company of Wilmington, Del.

The structure of the perfluoropolyether polymer may be modified to accommodate the downhole environment of the selected subterranean formations. Examples of factors for modifying the chemical and physical properties of the perfluoropolyether polymer may include, but are not limited to, molecular weight, linear or non-linear structure, types of perfluoroethoxy repeating units, homopolymer or copolymer of more than one perfluoroether repeating units, ratio of different perfluoroalkoxy repeating units, types of thickener, etc. For example, a non-linear polymer containing pendant trifluoromethyl groups, (—CF$_3$), may have enhanced acidic inertness because the pendant trifluoromethyl groups immediately adjacent to the ether (—O—) linkage may provide some shielding to protect that linkage from acid-catalyzed cleavage. Linear polymers may exhibit less change in viscosity with temperature and pressure than non-linear polymers.

Various types of thickeners typically used for the hydrocarbon-based greases may be used in the non-hydrocarbon-based grease 136. By way of example and not limitation, the thickener may include a metal sulfonate thickener such as a sodium, magnesium, barium or calcium sulfonate; a metal soap thickener such as aluminum-, lithium-, or alkaline earth metal (e.g., calcium, barium, or magnesium) salt-based thickener; a metal complex soap thickener; a non-soap thickening agent such as clay, silica, carbon black, polyurea, ammeline, boron nitride, copper phthalocyanine, metal-free phthalocyanine, polytetrafluoroethylene polymer, fluorinated ethylene-propylene copolymer, polyfluorophenylene polymer, zinc oxide, or a combination thereof.

As one particular non-limiting example embodiment, the non-hydrocarbon-based grease 136 may comprise a perfluoroalkylether polymer and a polytetrafluoroethylene thickener.

The thermal and pressure stabilities of the non-hydrocarbon-based grease 136 may be varied depending on the types and structures of the perfluoroalkylether polymer and the thickener. Furthermore, the non-hydrocarbon-based grease 136 may be formulated with other chemicals to meet specific performance criteria relevant to the operation of a particular wellbore tool under selected downhole conditions. The non-hydrocarbon-based grease 136 may include an additive to further impart or enhance performance characteristics desirable for downhole drilling applications. The additives may be solid additives, liquid additives, oil-soluble additives, oil-insoluble additives, or a combination thereof.

Non-limiting examples of such solid additives include metal sulfides such as MoS$_2$; friction reducing solids such as graphite or polytetrafluoroethylene (PTFE); silica; inorganic sulfur-, phosphorus-, or boron-containing solids; titanium; zirconium; or combinations thereof.

Examples of oil soluble additives include, but are not limited to, extreme pressure additives (i.e., load carrying additives), oxidation inhibitors, wear and friction reducing additives, polymer additives for enhanced grease integrity, pour point depressants, corrosion inhibitors, anti-rust additives, or combinations thereof.

Extreme pressure additives and wear and friction reducing additives may include metal-based additives that are known to be capable of forming a tribochemical film upon application of elevated pressure or temperature. Examples of such additives may include, but are not limited to, salts of zinc, antimony, bismuth, molybdenum. Alternatively, the extreme pressure additives and wear and friction reducing additives may include non-metal additives. Non-limiting examples of such additives may include, but are not limited to, sulfur/nitrogen containing heterocyclic compounds such as thiadiazole derivatives. Such additives may include chemicals that interact or react with metal surfaces. Furthermore, by way of example and not limitation, the perfluoroalkylether polymers may include aliphatic or aromatic phosphate; dialkyl di- or tri-sulfides; a dithiocarbamate-based compound; dithiophosphate; or the like.

Non-limiting examples of oxidation inhibitors that may be included in the grease 136 include hindered phenols such as butylated hydroxyl toluene; aryl amines; polymerized, nitrogen-containing heterocycles; and the like. Examples of optional polymer additives that may be included in the grease 136 for enhanced integrity of the grease 136 include, but are not limited to, olefin copolymers, styrene derivatives, isobutylene polymers, and the like. Pour point depressants that may be included in the non-hydrocarbon-based grease 136 include, but are not limited to, polyalkylmethacrylates, styrene ester polymers, alkylated naphthalenes, ethylene-vinyl acetate copolymers, and polyfumarates. Corrosion inhibitors that may be included in the non-hydrocarbon-based grease 136 include, but are not limited to, copper-silver corrosion suppressers, organic nitrogens, and sulfur-containing compounds.

Moreover, the non-hydrocarbon-based grease 136 may include a metal deactivator or a metal passivator such as mercaptobenzothiazole (MBT); trizaole; 2,5-Dimercapto-1,3,4-thiadiazole (DMTD); or derivatives thereof.

The use of grease 136 having a composition as described herein in wellbore tools may provide certain advantages over hydrocarbon-based greases commonly used in wellbore tools.

Drilling fluids in wellbores often include hydrocarbons such as methane (CH$_4$), ethane (C$_2$H$_6$), propane (C$_3$H$_8$), and ethane (C$_2$H$_4$), along with carbon dioxide (CO$_2$) and hydrogen sulfide (H$_2$S). Hydrocarbons in the drilling fluids may react with grease and other seal components in wellbore tools. In addition, while certain greases and seal materials may be stable and chemically inert with respect to common downhole hydrocarbons and chemicals at ambient temperatures and pressures, it is difficult to predict whether they will remain stable and chemically inert at elevated temperatures and pressures. Furthermore, hydrocarbons commonly found in drilling fluid may react with or dissolve in hydraulic fluids (e.g., the hydraulic fluid 120) commonly used in wellbore tools, which may lead to various hazards that not only increase operating cost, but also threaten the safety of drilling operators. The hydraulic fluids having hydrocarbons dissolved therein may cause corrosion of mechanical or electrical components of the wellbore tools. Furthermore, after drilling operations, wellbore tools are returned to the surface of formation where the pressure is significantly reduced relative to the elevated downhole pressures. As the pressure reduces, the solubility of any hydrocarbons dissolved in the hydraulic fluid decreases. As a result, hydrocarbons may be released upon disassembly of the wellbore tools after use, which also may be hazardous.

Previously known, hydrocarbon-based greases may not be adequately chemically inert with respect to hydrocarbons and other chemicals commonly encountered in downhole environments. Hydrocarbon-based greases are susceptible to chemical reactions with hydrocarbons. As such, hydrocarbons may permeate through the hydrocarbon-based grease and may react with and degrade seals, hydraulic fluid, and other components of the wellbore tools.

Mineral oil and synthetic lubricants such as poly-α-olefin (PAO) have been used in an effort to address such problems due to their enhanced chemical inertness and physical stabilities at higher pressure and temperature. However, long term exposure to elevated temperatures gradually breaks down the lubricity and viscosity of the mineral oil and PAO lubricants. For example, these lubricants typically suffer excessive loss of lubricity and viscosity at temperatures above 285° C. At these high temperature ranges, mineral oil and PAO lubricants may also degrade many elastomers commonly used as component parts for wellbore tools. Although the elastomers may not be degraded significantly by slight contamination with hydrocarbons in wellbore fluids that migrate through the seals, mineral oil and PAO lubricants can react with $H_2S$ and carbonize excessively at high temperatures. Furthermore, mineral oil and PAO lubricants are quite miscible with many types of hydrocarbons including those present in the wellbore fluids.

Non-hydrocarbon-based grease 136 as described herein may be less susceptible to dissolution of hydrocarbons therein, and may be more chemically inert with respect to hydrocarbons and chemicals commonly encountered in downhole environments, relative to previously known greases commonly used in wellbore tools.

Although the foregoing description contains many specifics, these are not to be construed as limiting the scope of the present compositions and devices, but merely as providing certain embodiments. Similarly, other embodiments of the compositions and devices may be devised that do not depart from the scope of the present disclosure. For example, features described herein with reference to one embodiment also may be provided in others of the embodiments described herein. The scope of the invention is, therefore, indicated and limited only by the appended claims and their legal equivalents, rather than by the foregoing description. All additions, deletions, and modifications to the compositions and devices, as disclosed herein, which fall within the meaning and scope of the claims, are encompassed by the present invention.

What is claimed is:

1. A wellbore tool, comprising:
   a first component;
   a second component; and
   a grease disposed between the first component and the second component, the grease comprising a non-hydrocarbon-based grease, the grease remaining at least substantially impermeable to hydrocarbons at temperatures up to at least about 150° C. and pressures up to at least about 27 MPa,
   wherein the non-hydrocarbon-based grease comprises a perfluoroalkylether polymer and a thickener, the perfluoroalkylether polymer comprising at least one structure selected from the group consisting of:
   $F—[CF(CF_3)CF_2—O—]_n—CF_2CF_3$;
   $CF_3CF_2O—[CF(CF_3)CF_2—O—]_n—CF_2CF_3$;
   $CF_3O—[CF(CF_3)CF_2—O—]_y—[CF_2—O—]_m—CF_3$;
   $CF_3O—[CF_3CF_2—O—]_y—[CF_2—O—]_m—CF_3$; and
   $CF_3CF_2CF_2O—[CF_2CF_2CF_2—O—]_n—CF_2CF_3$,
   wherein n is 10 to 60, and (y+m) is 10 to 60.

2. The wellbore tool of claim 1, wherein the thickener is selected from the group consisting of a metal sulfonate thickener, a metal complex soap thickener, a non-soap thickener, and combinations thereof.

3. The wellbore tool of claim 1, wherein the thickener comprises polytetrafluoroethylene.

4. The wellbore tool of claim 1, wherein the non-hydrocarbon-based grease further comprises an additive.

5. The wellbore tool of claim 4, wherein the additive comprises at least one of a metal sulfide, a friction reducing solid, graphite, polytetrafluoroethylene, silica, an inorganic sulfur-containing solid, an inorganic phosphorus-containing solid, an inorganic boron-containing solid, titanium, and zirconium.

6. The wellbore tool of claim 4, wherein the additive comprises at least one of an extreme pressure additive, an oxidation inhibitor additive, a wear reducing additive, a friction reducing additive, a polymeric additive, a pour point depressant additive, a corrosion inhibitor additive, and an anti-rust additive.

7. The wellbore tool of claim 1, wherein the wellbore tool comprises a rib steered motor.

8. The wellbore tool of claim 7, wherein the first component comprises a pressure compensation piston and the second component comprises a tubular body.

9. A method of manufacturing a wellbore tool, comprising:
   selecting a grease to comprise a non-hydrocarbon-based grease that remains at least substantially impermeable to hydrocarbons at temperatures up to at least about 150° C. and pressures up to at least about 27 MPa, wherein the non-hydrocarbon-based grease comprises a perfluoroalkylether polymer and a thickener, the perfluoroalkylether polymer comprising at least one structure selected from the group consisting of:
   $F—[CF(CF_3)CF_2—O—]_n—CF_2CF_3$;
   $CF_3CF_2CF_2O—[CF(CF_3)CF_2—O—]_n—CF_2CF_3$;
   $CF_3O—[CF(CF_3) CF_2O—]_y—[CF_2—O—]_m—CF_3$;
   $CF_3O—[CF_3CF_2—O—]_y—[CF_2—O—]_m—CF_3$; and
   $CF_3CF_2CF_2O—[CF_2CF_2CF_2—O—]_n—CF_2CF_3$,
   wherein n is 10 to 60, and (y+m) is 10 to 60; and
   disposing the grease at an interface between a first component of the wellbore tool and a second component of the wellbore tool.

10. The method of claim 9, wherein selecting a grease to comprise a non-hydrocarbon-based grease comprises selecting the non-hydrocarbon-based grease to comprise the perfluoroalkylether polymer and a thickener selected from the group consisting of a metal sulfonate thickener, a metal complex soap thickener, a non-soap thickener, and combinations thereof.

11. The method of claim 9, wherein selecting a grease to compromise a non-hydrocarbon-based grease comprises selecting the non-hydrocarbon-based grease to comprise the perfluoroalkylether polymer and a polytetrafluoroethylene thickener.

12. The method of claim 9, wherein selecting a grease to comprise a non-hydrocarbon-based grease comprises selecting the non-hydrocarbon-based grease to comprise:
   the perfluoroalkylether polymer;
   the thickener; and
   at least one additive selected from the group consisting of a metal sulfide, a friction reducing solid, graphite, polytetrafluoroethylene, silica, an inorganic sulfur-containing solid, an inorganic phosphorus-containing solid, an inorganic boron-containing solid, titanium, and zirconium.

13. The method of claim 9, wherein selecting a grease to comprise a non-hydrocarbon-based grease comprises selecting the non-hydrocarbon-based grease to comprise:
   the perfluoroalkylether polymer;
   the thickener; and
   at least one additive selected from the group consisting of an extreme pressure additive, an oxidation inhibitor additive, a wear reducing additive, a friction reducing additive, a polymeric additive, a pour point depressant additive, a corrosion inhibitor additive, and an anti-rust additive.

* * * * *

UNITED STATES PATENT AND TRADEMARK OFFICE
CERTIFICATE OF CORRECTION

PATENT NO. : 9,057,228 B2  
APPLICATION NO. : 13/537474  
DATED : June 16, 2015  
INVENTOR(S) : Karsten Fuhst and Jan C. Bertke Page 1 of 1

It is certified that error appears in the above-identified patent and that said Letters Patent is hereby corrected as shown below:

In the claims:
CLAIM 1, COLUMN 9, LINE 43, change "$1_y\text{---}[CF2$" to --$1_y\text{---}[CF_2$--

Signed and Sealed this
Twenty-fourth Day of November, 2015

Michelle K. Lee
*Director of the United States Patent and Trademark Office*